(12) United States Patent
Dignum et al.

(10) Patent No.: US 7,596,745 B2
(45) Date of Patent: Sep. 29, 2009

(54) PROGRAMMABLE HARDWARE FINITE STATE MACHINE FOR FACILITATING TOKENIZATION OF AN XML DOCUMENT

(75) Inventors: Marcelino M. Dignum, Menlo Park, CA (US); Jochen Behrens, Santa Cruz, CA (US); Wayne F. Seltzer, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 745 days.

(21) Appl. No.: 11/272,762

(22) Filed: Nov. 14, 2005

(65) Prior Publication Data

US 2007/0113170 A1 May 17, 2007

(51) Int. Cl.
*G06F 17/00* (2006.01)
*G06F 9/45* (2006.01)
*G06F 13/00* (2006.01)

(52) U.S. Cl. .................. 715/234; 717/141; 711/104
(58) Field of Classification Search .............. 715/234; 717/141; 711/104; 707/3
See application file for complete search history.

(56) References Cited

U.S. PATENT DOCUMENTS

| | | | |
|---|---|---|---|
| 5,664,155 A * | 9/1997 | Elko et al. ................. | 711/170 |
| 6,665,725 B1 | 12/2003 | Dietz | |
| 6,892,237 B1 | 5/2005 | Gai et al. | |
| 7,055,093 B2 * | 5/2006 | Tozawa et al. .............. | 715/234 |
| 7,275,069 B2 * | 9/2007 | Hundley et al. ........... | 707/104.1 |
| 7,275,208 B2 * | 9/2007 | Uramoto et al. ............ | 715/237 |
| 7,437,374 B2 * | 10/2008 | Chen et al. ................. | 707/101 |

| | | |
|---|---|---|
| 2003/0023633 A1 | 1/2003 | Ross |
| 2004/0083221 A1 | 4/2004 | Dapp et al. |
| 2004/0083466 A1 * | 4/2004 | Dapp et al. ................. 717/143 |

(Continued)

FOREIGN PATENT DOCUMENTS

WO        0184358 A1    11/2001

(Continued)

OTHER PUBLICATIONS

Gottlob, Georg, et al, "Efficient Algorithms for Processing XPath Queries", Transactions on Database Systems (TODS), vol. 30, Issue 2, Jun. 2005, pp. 444-491.*

(Continued)

*Primary Examiner*—Laurie Ries
(74) *Attorney, Agent, or Firm*—Park, Vaughan & Fleming LLP

(57) ABSTRACT

A hardware finite state machine for facilitating the processing of an XML (Extensible Markup Language) document or other structured data stream. An accelerator is implemented in hardware to enable fast processing of a document (or a segment thereof). The accelerator includes a finite state machine that embodies a ternary CAM (Content-Addressable Memory) and associated RAM (Random Access Memory). Processing of the document is divided into multiple states, with each state transition defined by a markup delimiter that triggers the transition. The CAM is programmed with entries containing the processing states and, for each possible transition from that state, a pattern for matching delimiters that trigger the possible transitions. For a CAM entry matching the current processing state and a sequence of characters from the document, which may contain a delimiter, the associated RAM identifies the next state and any action to be taken (e.g., to shift the sequence of characters).

27 Claims, 8 Drawing Sheets

U.S. PATENT DOCUMENTS

| | | | |
|---|---|---|---|
| 2004/0220882 A1 | 11/2004 | Suto et al. | |
| 2005/0038951 A1 | 2/2005 | Remedios | |
| 2005/0132342 A1* | 6/2005 | Van Lunteren | 717/143 |
| 2005/0138381 A1 | 6/2005 | Stickle et al. | |
| 2005/0234844 A1* | 10/2005 | Ivanov | 707/1 |
| 2005/0240911 A1 | 10/2005 | Hundley et al. | |
| 2007/0050704 A1* | 3/2007 | Liu | 715/513 |
| 2007/0061720 A1* | 3/2007 | Kriger | 715/700 |

FOREIGN PATENT DOCUMENTS

| | | | |
|---|---|---|---|
| WO | 2004040446 A2 | 5/2004 | |

OTHER PUBLICATIONS

"Introduction to Compiling", XP-002200775, 1986.
Anonymous, "Random Access XML (RAX 4) Content Processor", http://www.tarari.com/rax/index.com (web page), pp. 1-4.
Anonymous, "XML/Web Services and Network Security Acceleration", http://tarari.com/PDF/Tarari-XMLWebSecur.pdf, pp. 1-3.
Anonymous, "Tarari XML RAX 4 Content Processor Fact Sheet", http://www.tarari.com/PDF/Tarari_RAX4_Factsheet.pdf, Fact Sheet, pp. 1-2.
Anonymous, "Random Access XML—RAX 4 Content Processor", http://tarari.com/PDF/Tarari_RAX4_ProductBrief.pdf, Product Brief, pp. 1-2.

* cited by examiner

PROGRAMMABLE HARDWARE FINITE STATE MACHINE FOR FACILITATING TOKENIZATION OF AN XML DOCUMENT

RELATED APPLICATIONS

This application is related to U.S. patent application Ser. Nos. 11/272,949, 11/273,351 and 11/272,843, all of which were filed Nov. 14, 2005.

BACKGROUND

This invention relates to the field of computer systems. More particularly, a programmable finite state machine is provided, along with methods of using the state machine to facilitate the hardware processing of an XML document or other structured stream of data.

The availability of distributed computing resources and high-bandwidth interconnections (e.g., the Internet) has enabled tremendous growth in the serving and sharing of applications and data across a distributed computing environment such as the Internet or an intranet. In particular, web services and service-oriented architectures continue to grow in popularity.

XML (eXtensible Markup Language), developed by the World Wide Web Consortium (W3C), provides a class of data objects (i.e., XML documents) for conveying data. XML is increasingly chosen as the way to transfer and store data within a service-oriented architecture or distributed computing environment, partly because it provides a well-defined format supported on virtually all computer platforms and architectures. Of particular note, the web services infrastructure is being built around XML.

An XML document consists of a series of characters, some of which form character data and some of which form markup. Markup encodes a description of the document's layout and structure, and includes comments, tags or delimiters (e.g., start tags, end tags, white space), declarations (e.g., document type declarations, XML declarations, text declarations), processing instructions and so on. Character data comprises all document text that is not markup.

Because an XML document is textual in nature, a software application that consumes the document's data must be able to examine the document, access its structure and content (e.g., to separate character data from markup) and place the data into an internally usable form. A software module that parses an XML document is generally called an XML processor, and works on behalf of the application. Applications often contain their own XML processors, thus causing duplication of effort among multiple applications.

A large proportion of the processor time needed to execute program instructions for parsing an XML document (e.g., approximately 50-70%) is spent decoding and validating the document's characters, tokenizing its content, and creating and maintaining a symbol table for the tokenization. Even though these tasks must be performed in similar manners for many XML documents, they continue to be done in software in almost all computing environments.

Additional processing is required if a security scheme must be applied to accept or examine an incoming secure XML document, or to make an outgoing XML document secure. The amount of additional processing increases with the complexity of the security mechanism (e.g., the size of a cryptographic key used to decrypt or encrypt the document, the type of digital signature). Thus, the nature of software already slows the processing of XML documents; the additional processing required to enforce a security scheme makes the situation even worse.

Because parsing of XML documents has always been performed in software, the increasing use of XML documents may cause an XML processor to become a bottleneck and consume more and more processor time—time that could otherwise be spent executing the application or performing other work. The demand for processor time required for software parsing of XML documents will only increase as more and more organizations and applications adopt XML as a means for transferring data.

And, because virtually all XML documents must be parsed before their data can be manipulated, XML parsing is critical to related technologies such as XSLT (Extensible Stylesheet Language Transformations), Xpath (XML Path Language), UBL (Universal Business Language), etc.

Attempts to provide superior XML processing solutions fail to achieve this goal for various reasons. For example, some proposed hardware solutions involve devices located across a PCI-X (Peripheral Component Interconnect—eXtended) bus or other communication bus from a host computer system's central processing unit (CPU). These proposed solutions suffer from excessive memory and communication (e.g., bus, network) latencies, thereby limiting their efficiency. And, some solutions may lack the necessary resources (e.g., dedicated processor, memory, security engine) for expediting the processing of XML documents.

Other devices are implemented as separate network nodes, such as appliances based on standard server hardware, and appear to simply involve traditional software methods of XML processing. Dedicating a network device (e.g., an appliance) to software-based XML processing does little to expedite the handling of XML documents.

One problem with software-based efforts to process XML documents is that they require a large number of inefficient string comparisons. For example, each time a piece of a document is read by an application or XML processor, it is serially compared to a number of XML entity forms (e.g., tags, declarations, comments) to determine the significance of that document piece. This can take a noticeable amount of time for a long document.

Another problem with existing XML processors is that they are designed to process an entire XML document before moving to the next. A very large document may therefore monopolize the XML processor, to the detriment of smaller documents.

A finite state machine (FSM) is an abstract machine for modeling the behavior of application programs, and is composed of states, transitions and actions. A state stores historical information about the application, in that it reflects program input up to the present moment.

Each state of a finite state machine has transitions to any number of other states. A transition thus indicates a state change, and is described by a condition (or input) that must occur in order to enable the transition. As a result of a transition, a new state is entered (or the same state is re-entered) and some action (or output) may result. A state machine may alternatively be viewed as a function that maps a sequence of input events into a corresponding sequence of output events.

In some situations, an FSM may be a better tool than structured program code for solving a programming task. For example, a text string representing a floating point number may comprise a sequence of characters very similar to an algebraic expression. To distinguish one from the other, a procedural set of rules might be applied that defines the format of a text string or an expression. If implemented using structured program code, a lengthy series of IFS, ELSES and/or other statements must be traversed to perform the analysis. An FSM may be written to perform the same task, using notation that is easier to understand.

Programmable finite state machines having large numbers of states and state transitions traditionally have not been implemented in hardware, due to the inherent cost and complexity.

SUMMARY

In one embodiment of the invention, a programmable hardware finite state machine (FSM) is provided for facilitating the processing of an XML (Extensible Markup Language) document or a segment of an XML document. Processing of the document includes parsing the document to extract its information set, and production of a stream of token headers to communicate the document's data to an application.

In this embodiment, the finite state machine embodies a ternary CAM (Content-Addressable Memory) or TCAM, with associated RAM (Random Access Memory). The FSM may be implemented as part of a hardware XML accelerator, which may also include a processor and logic for controlling the processing.

The finite state machine divides the parsing of an XML document into multiple states, with each state transition defined by an XML markup delimiter that triggers the transition when encountered during the parsing. Thus, each time certain delimiters are encountered in the document, the FSM may transition to a different (or the same) state, depending on the type of delimiter (e.g., a start tag, an end tag, a comment).

The CAM is programmed with any number of entries. Each entry contains one of the possible parsing states and a character pattern configured to identify and match a delimiter that triggers a transition from that state. More specifically, during a given state of processing, that state and a sequence of characters from the document (which may contain a delimiter) are compared to the CAM entries. If there are no matches, a next sequence of characters is used.

For each CAM entry that matches the input, a hit signal is raised. If more than one entry matches, one is chosen (e.g., using longest-prefix matching) and a corresponding entry in the associated RAM is read. The RAM entry identifies the state to transition to and indicates how to adjust the character sequence (e.g., by shifting some number of characters). The RAM entry may also identify a token header to be produced. Token headers are used to convey an XML document's data and/or structure to an application.

In other embodiments of the invention, a finite state machine may be configured to parse other structured data streams (e.g., packets, HTML documents, database records).

DETAILED DESCRIPTION

Figure 1:
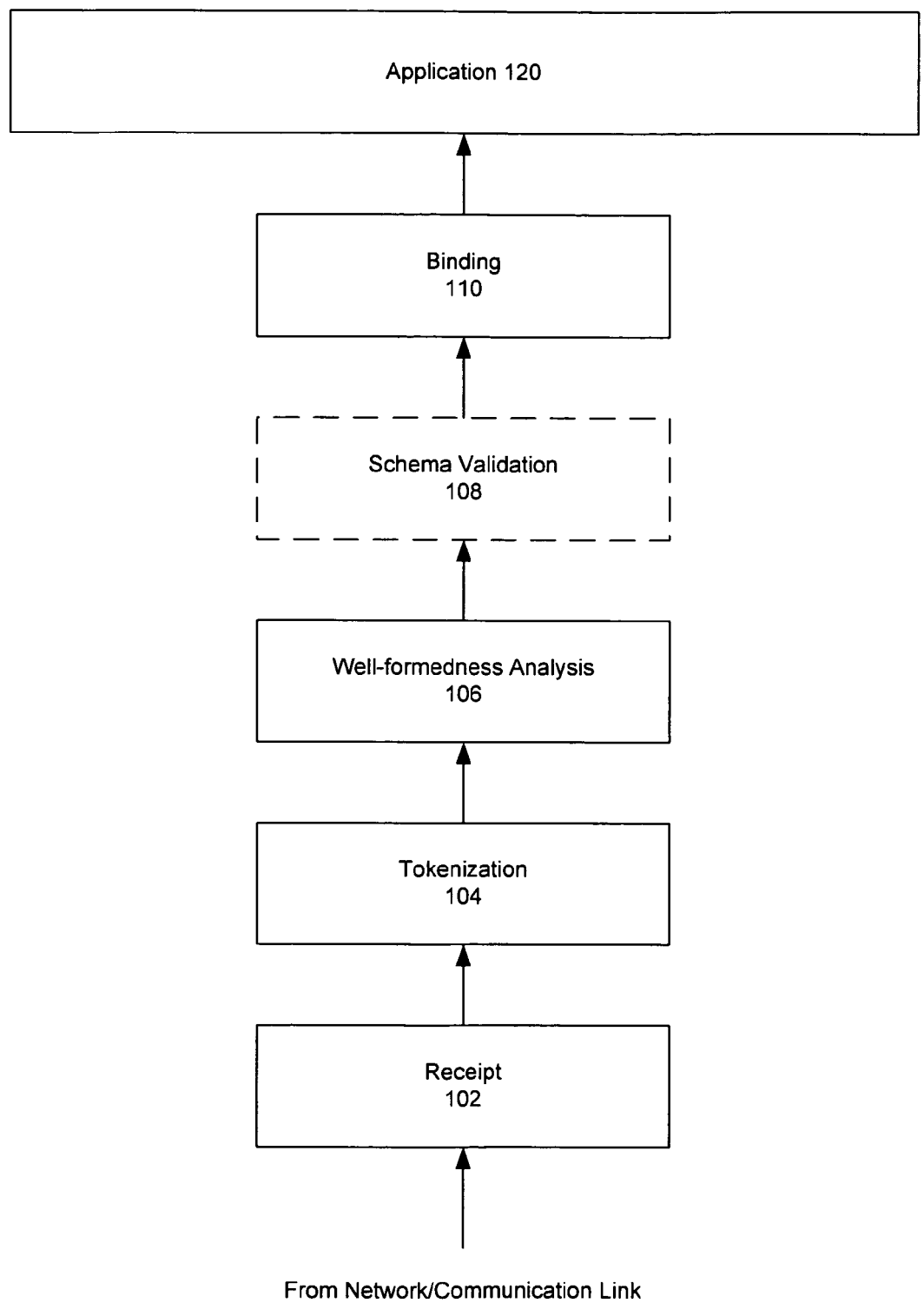
FIG. 1 is a block diagram depicting a sequence of processing of an XML document, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Introduction

In one embodiment of the invention, a hardware XML (eXtensible Markup Language) accelerator is provided, along with methods of using the accelerator. In this embodiment, the XML accelerator enables much faster processing of an XML document than may be performed with just software or with attempted hardware solutions that incur substantial latencies (e.g., memory, communication bus) and transaction overhead.

In this embodiment, the XML accelerator includes one or more processors, such as CMT (Chip Multi-Threaded) processors having one or more cores (e.g., four, eight). In one implementation of this embodiment of the invention, the XML accelerator may serve as a subsystem of a host computer, in which case the host computer's CPU may offload XML processing to the accelerator. In another implementation, the accelerator's processor(s) may act as the central processing unit(s) of a computer system. Other embodiments of the invention may be implemented without CMT processors.

The hardware XML accelerator includes an XML parser or parsing unit to parse an XML document (or a segment of an XML document) to identify its structure and obtain its data, and may include a cryptographic component or other security unit for enforcing an XML security scheme, web services security process, or other security scheme. The accelerator may also include one or more DMA (Direct Memory Access) engines, and other interfaces to memory, communication links (e.g., a network), a data or communication bus (e.g., PCI, InfiniBand, HyperTransport, PCI-Express) and/or other computer/communication devices.

An XML accelerator may therefore provide an entire "system on a chip" computing solution. In addition to providing much faster processing of XML documents, a hardware XML accelerator described herein reduces power consumption and conserves space on the printed circuit board comprising the accelerator.

In another embodiment of the invention, an XML parser unit is provided for performing lower-level processing of an XML document (or a segment of a document), and may be implemented as part of an XML accelerator. In one implementation, the parser unit reads characters from the document, decodes them as necessary (e.g., to place them in UTF-16 format), performs character validation, maintains a symbol table, identifies tokens within the document that describe the document's structure and/or data, extracts document data, generates token headers to represent the information set of the document, and writes the token headers and data to memory. In this embodiment, token headers correspond to identified tokens, and describe the document's data and/or structure to an application. The parser unit may also perform base64 encoding/decoding to manipulate or generate a binary (e.g., encrypted) portion of an XML document.

In another embodiment of the invention, a programmable hardware finite state machine (FSM) is provided for facilitating the parsing and tokenization of an XML document (or a document segment), along with a method of using the FSM. In this embodiment, tokenization involves the identification of tokens within the XML document and the generation of corresponding token headers. The FSM may be implemented within a hardware XML parser unit, which, as described above, may be implemented within a hardware XML accelerator.

In this embodiment, the finite state machine comprises a programmable TCAM (Ternary Content Addressable Memory), with associated RAM (Random Access Memory) and control logic. The TCAM is programmable in that it may be dynamically programmed with entries comprising state information and input data patterns. By comparing TCAM entries with character input from an XML document and the machine's current state, a matching TCAM entry is identified to determine which state transition to activate. The RAM stores logic for controlling the tokenization, modifying the character input, and/or taking other action.

In yet another embodiment of the invention, an XML accelerator is configured to perform virtualized parsing of an XML document. In this embodiment, the document is divided into segments of virtually any size, and each segment is parsed separately. As a result, the processing of multiple documents may be interleaved, one segment at a time. And, a single document may be processed as it is received (e.g., packet by packet, page by page) instead of waiting for the entire document to be received. Also, if the XML accelerator includes multiple instances of particular resources (e.g., processors, parser units, cryptographic engines), multiple documents can be processed simultaneously, with different resources being used for different document segments.

Embodiments of the invention described herein are configured to parse and/or otherwise process XML documents conforming to the Extensible Markup Language (XML) 1.0 (Third Edition) specification, which is available at http://www.w3.org and is incorporated herein by reference. Other embodiments may be readily developed for other versions of XML. And, because an FSM described herein is programmable, it can be modified for use with any version of XML now existing or hereafter developed, and can also be programmed to parse other types of content (e.g., HTML, SGML, word processor files, database files) now known or hereafter developed.

A Hardware XML Accelerator

In an embodiment of the invention, a hardware XML accelerator enables expedited parsing of some or all of an XML document. In this embodiment, a single hardware module comprises embedded logic and circuitry for performing the parsing and related activity (e.g., security, symbol table maintenance, DMA operations), and a processor for executing the logic. As described above, in different implementations, a processor of an XML accelerator may act as the central processing unit or device of a host computer, or the accelerator may function as a subsystem of a host.

A hardware XML accelerator receives or retrieves an XML document (or a segment of a document), parses it to ascertain its structure and extract its character data content, and produces a stream of binary token headers to convey the structure and character data to an application. The token headers are binary in that they employ binary numerical representation (e.g., rather than character representation).

The data may be written to memory separately, or embedded within the stream. The accelerator may also process an outgoing XML document, to facilitate serialization and/or apply a security scheme, for example.

By processing an XML document with a hardware XML accelerator described herein, overhead associated with XML processing is greatly reduced, along with bus utilization and latency. The resulting XML and XML security processing throughput can be significantly increased as a result.

FIG. 1 is a block diagram illustrating the processing of an incoming XML document (or a segment of an XML document), by a hardware XML accelerator, according to one embodiment of the invention. After processing phases 102-110 are complete, the document's data are fully available to application program 120.

In receipt phase 102, an XML document is received and extracted from its network or other protocol encapsulation if necessary. In one implementation, a DMA (Direct Memory Access) engine operates on the accelerator to read and/or write XML documents to/from memory.

In tokenization phase 104, the document is parsed to identify and separate constituent elements or entities. For example, character data, markup declarations (e.g., tags, delimiters), tag names and/or other markup are identified, attributes and their values are located, etc. Tokens are defined for some or all elements, particularly those that occur or may occur multiple times within a single XML document, which may be treated as symbols.

In well-formedness analysis phase 106, document text is examined to ensure it conforms to an XML specification in the way characters are used, tags are nested, etc. For example, some characters (e.g., "<", "&") are automatically assumed to be part of a tag or delimiter unless they are marked in some way (e.g., as an escape sequence entity such as "<" or "&"), a corresponding end tag must be located for each start tag, and so on. Well-formedness analysis phase 106 may include validating individual characters of the document, to ensure they are legal characters.

Also as part of phase 104 and/or phase 106, a symbol table is maintained. The symbol table is populated with symbols (e.g., names) parsed from the document. The symbol table maps the symbols to integer values, so that later occurrences of the same symbol may be replaced with the corresponding integer. This will help reduce the number of string comparisons that must be performed during later XML processing. Illustratively, some or all tokens that indicate document structure other than data are stored as symbols.

In optional schema validation phase 108, a document purporting to conform to a DTD (Document Type Definition) or XML schema (e.g., as required by a particular web service) may be validated to verify its conformance.

In binding phase 110, the document's textual representations of data are mapped to native data types. For example, the character string "123" may be translated into an integer format if appropriate. After binding phase 110, application 120 can operate on the document's data using native data structures.

In one embodiment of the invention, some or all of the phases of XML processing described above are implemented in hardware. In one implementation, phases 102-104 are implemented in hardware, and phase 106 is partially implemented in hardware (e.g., character validation) and partly in firmware executed by a processor operating within the accelerator. In other embodiments, the division of labor between an accelerator processor executing firmware and specialized hardware elements may be different. An XML accelerator may offer native interfaces (e.g., standard Java APIs) to an application that consumes the document's data.

A symbol table used to facilitate document parsing may also be implemented in hardware. As a result, even if partial or full well-formedness checking is performed in software, it can do so without having to perform many (or any) string comparisons. Instead, the software compares the integers that were mapped to those strings in the symbol table.

Figure 2:
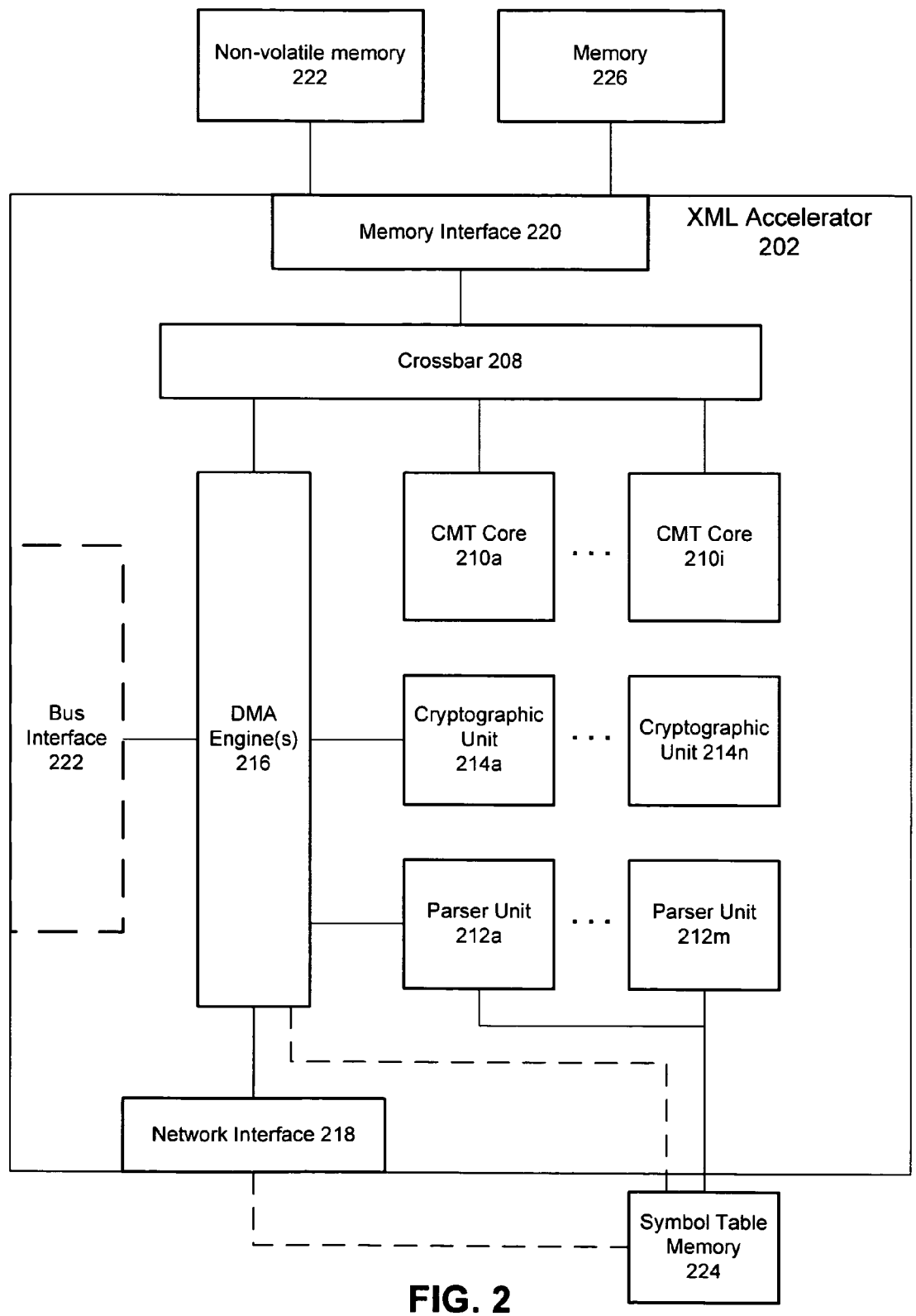
FIG. 2 is a block diagram of a hardware XML accelerator, in accordance with an embodiment of the invention.

FIG. 2 is a block diagram of a hardware XML accelerator, according to one embodiment of the invention. In this embodiment, accelerator 202 comprises a single chip. As indicated, the accelerator may be located on a printed circuit board with other hardware elements that assist the XML processing (e.g., memory). As described previously, an XML accelerator may operate as a subsystem of a host computer or operate as a system on a chip to perform virtually all processing functions of a computing device.

XML accelerator 202 includes multiple CMT (Chip Multi-Threading) processors in the form of cores 210a-210i. The multi-threaded processors, or cores, may employ multiple cores on a single chip, may execute multiple threads on a single core, or may combine these two aspects by executing multiple threads on each of multiple cores. The latter configuration is depicted in the embodiment of the invention illustrated in FIG. 2.

In one implementation the accelerator includes 4 multi-threaded cores. Each core has its own L1 cache, and together, cores 210a-210i share an L2 cache (not shown).

In this embodiment of the invention, having multiple processor threads allows the XML processing pipeline to remain full or nearly full, despite the high speed with which the components of the XML accelerator operate. The threads may share any of the other components of accelerator 202. In another embodiment of the invention, the cores may be single-threaded, but may still share other components of the XML accelerator.

Accelerator 202 also includes multiple hardware parser units 212a-212m and multiple hardware cryptographic units 214a-214n. DMA engines 216 enable direct memory access operations via memory interface 220. In an alternative embodiment of the invention, a single parser unit or cryptographic unit is included in an accelerator and may be shared by multiple cores and/or multiple processor threads.

Crossbar 208 acts as a router to transfer data between memory and the various components of the accelerator.

Network interface or network interface unit 218 allows the accelerator to receive XML documents directly from a network link, and optional bus interface 222 enables the accelerator to be coupled to a host computer via a PCI, PCI-X, PCI-E (PCI-Express) or other communication bus. An XML accelerator may include any number of network interfaces, bus interfaces and/or other interfaces. For example, a single NIU (Network Interface Unit) may comprise multiple MAC (Medium Access Control) modules.

Illustratively, an XML document may be received by network interface 218 or bus interface 222 and transferred to memory by a DMA engine 216. A processor 210 can then direct the processing of the document.

Multiple memory modules are coupled to accelerator 202, including non-volatile memory 222, symbol table memory 224 and memory 226. Non-volatile memory 222 may comprise any form of non-volatile memory (e.g., RAM, ROM), and may store instructions for performing XML processing not performed by other hardware units (e.g., parser units 212, crypto units 214). For example, the non-volatile memory may store logic, executable by processor(s) 210, for performing additional well-formedness analysis (i.e., analysis not performed by a parser unit 212) and document validation (e.g., to verify conformance with a schema).

Thus, in the illustrated embodiment of the invention, no instructions or data need to be received from a host computer in order for accelerator 202 to function. In an alternative embodiment of the invention, however, operating logic may be received or retrieved from a local host computer or through a network.

Accelerator memory 226 may store a document (or document segment) being parsed, and receive token headers and data extracted from the document. DMA engines 216 may transfer document content between memory 226 and other components of the accelerator (e.g., parser unit 212, cryptographic unit 214).

Any suitable types of memory (e.g., SRAM, DRAM) may be employed for the various memory structures. In the embodiment of the invention illustrated in FIG. 2, however, symbol table memory 224 comprises FCRAM (Fast Cycle Random Access Memory) or another type of low-latency memory. In one implementation, network interface 218 is configured to separate network communication flows or other communication connections (e.g., TCP or Transmission Control Protocol flows) for processing by different cores 210, and may use one of the various memory structures (e.g., the FCRAM comprising symbol table 224) for buffering, protocol processing and/or other purposes.

In one embodiment of the invention, a hardware symbol table is preloadable, and multiple tables of different sizes may be stored simultaneously in symbol table memory 224. For example, when a received document appears (or is expected) to conform to a particular schema, the symbol table may be preloaded with symbols for any number of tokens that are expected or allowed to appear in the document. Additional symbols may or may not be permitted to be added to the table during document parsing in this embodiment. Symbol table memory 224 may be accessible via DMA engines 216. And, as indicated above, the symbol table memory may reside in a memory subsystem that is functionally coupled to, and used by, network interface 218.

As described in a following section, a hardware XML parser unit 212 may be activated by a processor 210 to perform any or all of several functions, such as character decoding, base64 encoding/decoding, tokenization (e.g., identifying document tokens), character validation, symbol table maintenance and token header processing (e.g., to generate token headers describing identified tokens).

In embodiments of the invention described herein, XML parser unit 212 parses an entire XML document or a single document segment before being available for other processing. Illustratively, the parser unit parses a document or document segment character by character, validates the characters and identifies data and various types of tokens (e.g., tags, names, delimiters).

It then maps tokens that are symbols to corresponding numerical identifiers for storage in a symbol table, and generates a stream of token headers and data for consumption by an application executing on the XML accelerator or elsewhere. The application may then parse or manipulate the token headers as necessary (e.g., to implement an API).

Cryptographic engines 214a-214n may be configured to decrypt an encrypted portion of an XML document, encrypt a portion of an outgoing document, verify or compute a digital signature, and/or perform other security-related functions. For example, a cryptographic unit 214 may facilitate the enforcement of SSL (Secure Sockets Layer) security, web services security, XML security, IPSec or some other security scheme. The cryptographic unit may be configured to apply a cryptographic algorithm such as DES, 3DES, AES, MD5, RC4, SHA or some other algorithm now known or hereafter developed.

In one embodiment of the invention, parts of an XML document may be parsed twice (i.e., by parser units 212) to apply web services security or XML security. For example, a first parsing operation may perform tokenization, character validation, symbol table processing and token header processing for all non-secure portions of the document, and may facilitate identification of secure portions. Then, a secure portion of the document may be base64 decoded, may be decrypted as necessary, a digital signature may be verified, etc. Resulting clear text XML may then be parsed as necessary. The reduction in bus utilization and latencies that result from having security processing performed within the same hardware as the XML processing can be significant.

Illustratively, security processing for web services security or XML security may be performed after well-formedness analysis phase 106 of the XML processing depicted in FIG. 1. As just described, phases 104 and 106 may then be repeated for document portions affected by the security processing. In other embodiments, security processing may be performed during phase 104 and/or 106.

An XML document being sent from a computer system comprising XML accelerator 202 may be processed by the accelerator to apply a security scheme. For example, the document may be parsed by a parser unit 212 to locate a portion of the document to be secured. A cryptographic unit 214 may be invoked to encrypt the document portion, compute a digital signature or perform some other security processing. Parser unit 212 may then perform base64 encoding of the cypher.

A Hardware XML Parser Unit

In one embodiment of the invention, a hardware parser unit is provided for performing lower-level processing of an XML document or a segment of a document (or some other type of content). For example, with reference to FIG. 1, the parser unit may perform some or all of the processing involved in document receipt phase 102, tokenization phase 104 and well-formedness analysis phase 106.

The parser unit may be implemented as part of a single hardware XML accelerator module, as described in the preceding section. As described in that section, the accelerator may also include one or more processors, various interfaces (e.g., network interface, memory interface, bus interface), a cryptographic engine, etc. The parser unit may comprise a programmable finite state machine (FSM) for facilitating the tokenization process. An illustrative FSM is described in the following section.

In an embodiment of the invention, one product of a hardware XML parser unit is a binary representation of an information set of an XML document, accompanied by the document's data. In this embodiment, the binary representation comprises a set of token headers describing the structure of the information set. Token headers and data may be forwarded from a parser unit in separate data streams.

Illustratively, a block of information output from a parser unit after parsing some or all of an XML document may include a contiguous set of character data extracted from the document, and a separate contiguous set of token headers describing document structure and identifying document locations from which the character data was extracted. This may help avoid unnecessary string allocations when the block is consumed by an application, and also allows the separate sets of information (e.g., character data, structure information) to be moved via separate DMA channels.

By providing the binary representation to an application in place of the raw XML content, a significant increase in performance is achieved because the application need not validate the information set, extract character data, etc.

Several types of entities are created or manipulated during the processing of an XML document. As described above, one end result is the generation of a stream of binary token headers designed to describe the document's structure and possibly convey the document's data to an application. Each token header corresponds to a token identified within the document, which may be data, and therefore can be considered to identify a portion of the document's structure (including data).

In one embodiment of the invention, characters of an XML document are parsed to differentiate markup from character data. Markup delimiters (e.g., characters such as "<" and ">", strings such as "</" and <!—", white space characters) are identified and used to differentiate tokens comprising data from tokens describing the document's structure.

In this embodiment, tokens are defined and used in a manner similar to the way in which tokens are used during compilation of a computer program. For example, tokens may include data, names (e.g., tag names, attribute names), processing instructions, declarations and other markup entities that the application may need or that may be useful in later processing of the document.

Some tokens, but not necessarily all, are stored as symbols in a symbol table. Data, for example, may be stored in memory for transfer to the application, without being represented in the symbol table.

Illustrative tokens that become symbols include names and prefixes of tags, attributes and namespaces. In the symbol table, a symbol/token is mapped to an identifier (e.g., an integer value) that will be used in place of the symbol's text in later processing of the document. This facilitates later comparisons, well-formedness analysis, consumption by the application, etc.

Each time a token that is a symbol is encountered during the parsing of a document, the symbol table is searched to determine if the symbol is already stored. If not, it is stored in the table and assigned an identifier. If it is already stored, its identifier is retrieved and used in place of the token.

For some or all tokens, token headers are generated to describe or communicate the tokens to the application. As described below, a token header may also identify the size of an XML document or a segment of a document, map a symbol token to its identifier, indicate where in the document a particular token is located, identify a memory location where data or some other portion of the document is stored, etc.

Figure 3:
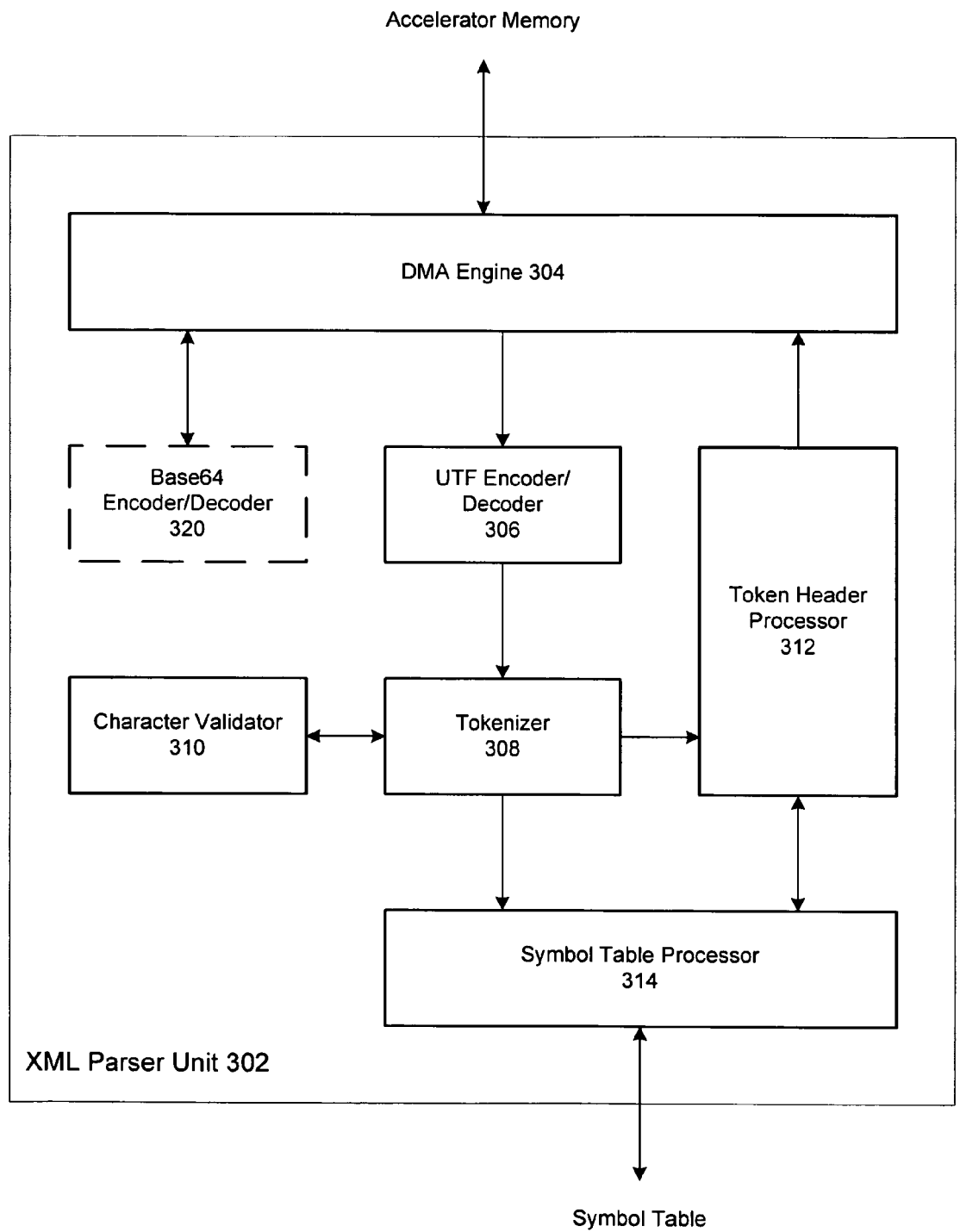
FIG. 3 is a block diagram demonstrating elements of a hardware XML parser unit, in accordance with an embodiment of the present invention.

FIG. 3 depicts the processing elements of a hardware XML parser unit, according to one embodiment of the invention. In this embodiment, parser unit 302 is embedded within a hardware XML accelerator that includes one or more processors.

Each logic module depicted in FIG. 3 performs a corresponding function, or multiple operations may be performed by a single module.

An XML accelerator that includes parser unit 302 also includes accelerator memory for storing a segment of an XML document as it is parsed, and a stream of token headers produced by the parser unit. The accelerator also includes memory used to store a symbol table for facilitating parsing and tokenization.

DMA engine 304 moves a document (or document segment) to be parsed into accelerator memory. Firmware may then activate the XML parsing process. In one implementation, DMA engine 304 operates intermittently during parsing of a document segment, to transfer chunks of the segment from accelerator memory into local buffers for consumption by parser unit 302.

DMA operations are also used for writing token headers and data back to accelerator memory, host computer memory, or other storage. DMA engine 304 may be dedicated to (e.g., embedded within) XML parser unit 302, or may comprise one of DMA engines 216 (FIG. 2) and be shared among multiple components of an XML accelerator.

In one implementation, an entire document or segment may be DMA'd into accelerator memory at once, for continuous parsing. In another implementation, a document or document segment may be DMA'd in fragments, with each succeeding fragment being moved into accelerator memory as parsing of the preceding fragment is completed.

XML documents may be received in different forms or with different character sets (e.g., ASCII, UTF-8, UTF-16). UTF encoder/decoder 306 operates to decode the document into a particular character set if necessary or desirable. For example, documents received in ASCII format may be decoded into UTF-16 or UTF-8 format. In an embodiment in which the parser unit parses a document on behalf of a Java application, encoder/decoder 306 places the document content into UTF-16 format.

Encoder/decoder 306 may automatically detect the endianness of a document and its UTF type (e.g., 8 or 16) by processing byte-order mark characters at the beginning of the document. If there are no byte-order mark characters present, auto-detection can be disabled and endian-ness and UTF type may then be supplied to the tokenizer via a segment control word. In addition, the encoder/decoder may check for properly formed surrogate pairs and perform end-of-line handling (e.g., as specified in the XML 1.0 specification).

UTF encoder/decoder 306 may also be applied to an outgoing document to encode the content as necessary, but may be bypassed if a document being processed is already in an acceptable format.

After any necessary decoding is performed, document content is delivered to tokenizer 308, which drives the production of token headers to be delivered to an application or other consumer. Tokenizer 308 involves scanning the document content to identify tokens and document structure. For example, a tokenizer may scan for starting and ending markup delimiters, identify data and other tokens and initiate creation of corresponding token headers, etc.

More particularly, during tokenization an XML document is examined character-by-character, with each character (e.g., other than delimiter characters) being submitted for validation by character validator 310. Depending on the parsing state, different characters may be valid. For example, after a particular XML delimiter is encountered, certain characters are legal and others are not. The validity of a character is thus examined within the applicable context or state.

In one implementation, only a subset of all possible characters may be validated by character validator 310. For example, for simplicity, only characters up to twelve bits in size may be validated by the hardware; larger characters may be validated by firmware. In other implementations, character validation may only be performed for characters within a particular character set.

During tokenization, data are identified to token header processor 312. During token header processing, the data are moved into memory via DMA operations 304.

For tokens identified by tokenizer 308, token header processor 312 drives the production of corresponding token headers. One or more token headers may be generated for a particular token or during a particular state of the parsing process. Token headers are transferred to accelerator memory through DMA operations, and are described in more detail below.

Each token that is a symbol is also identified to symbol table processor 314. Illustratively, symbols do not include document data, but may include tag names and prefixes, attribute names and prefixes, and so on. As described above, a hardware symbol table may be implemented in fast memory (e.g., an FCRAM, fast DRAM) located within or coupled to the XML accelerator.

When a symbol is submitted to symbol table processor 314, the symbol table is searched to determine if the symbol is already stored. If not, a symbol identifier may be generated (e.g., a hash of the symbol name) to represent the symbol, and the symbol and identifier may be stored in the symbol table and fed to token header processor 312. A token header may be generated to report the mapping between the symbol and the identifier. A token header may also be generated when the symbol table is full or when the length of a symbol exceeds the length supported by hardware.

If a symbol received by symbol table processor 314 is already stored in the symbol table, the symbol's identifier is retrieved from the symbol table and delivered to token header processor 312. The identifier may be used in place of the symbol's string within token headers.

Base64 encoder/decoder 320 may be initiated when binary data are detected within XML content being parsed, and/or when binary data is to be inserted into an outgoing XML document. For example, an incoming XML document may include binary image data in base64 encoded form. After the parser unit extracts the image data as character data, base64 encoder/decoder 320 may be initiated to decode the character data to extract the binary data.

Similarly, encrypted data within an incoming document may be base64 decoded in preparation for security operations performed by a cryptographic unit. Base64 encoder/decoder 320 may base64 encode information to be included in an outgoing XML document (e.g., as part of security processing or to embed an image). Base64 encoder/decoder 320 may also be capable of performing other types of encoding/decoding (e.g., UTF encoding/decoding), applying a compression or decompression technique, or otherwise facilitating the application of a security scheme.

In one embodiment of the invention, different memory buffers may be maintained to assist the various processing elements depicted in FIG. 3. For example, as characters are extracted by tokenizer 308 and validated by character validator 310, data characters may be moved to a memory buffer, characters of a symbol may be moved to a symbol buffer for use by symbol table processor 314, and characters of non-symbol tokens may be moved to a token header buffer for token header processor 312.

In other embodiments of the invention, the functions of a hardware XML parsing unit may be divided in a manner different from what is shown in FIG. 3. Upon completion of parsing, the firmware that initiated the parsing is signaled (e.g., via a completion ring) that the resulting stream of token headers and character data is ready.

The parsing of an XML document into data and a binary stream of token headers allows the document's content and structure to be delivered to an application in a format that requires little processing by the application. For example, the data can be readily transformed into the application's native data structures.

The following minimal XML document example may be used to illustrate one possible form of a token header stream stored in a file named 011.xml:

<doc a1="v1" a2="v2">
</doc>

In an embodiment of the invention, the following token stream is generated by token header processor 312 of FIG. 3:

BLOCK: len=130, chlen=0, next-block-offset=0
STREAM_INFO: id=1, name=011.xml
START_DOC: encoding=US-ASCII
SYMBOL_DEF: nsid=0, id=1, name=doc
START_TAG: nsid=0, id=1, attributeCount=2, nscount=0
SYMBOL_DEF: nsid=0, id=2, name=a1
ATTR_DEF: nsid=0, id=2
ATTR_STRING: v1
SYMBOL_DEF: nsid=0, id=3, name=a2
ATTR_DEF: nsid=0, id=3
ATTR_STRING: v2
END_TAG: nsid=0, id=1
END_DOC
END In this example, each token header begins with a token type (e.g., BLOCK, ATTR_STRING, END_TAG) and includes zero or more parameters or attributes. Some of the parameters may be determined and populated during token header processing 312, but others may be added by software, firmware or another component of the parser unit or XML accelerator.

For example, the "nsid" parameters identify namespaces, and the "id" parameters specify the symbol table identifier of a token corresponding to the token header to be generated. Both of these parameters may be formatted during token header processing. Similarly, the "name" parameters report the name of a token and are also available during token header processing.

In contrast, the BLOCK token header describes the structure of a block of token headers and data streamed from the hardware parser unit while parsing an XML document or segment of a document. The BLOCK header may include the total length of the block, the length of the character data portion, information indicating where to find the next BLOCK header, etc. One or more parameters of a BLOCK token header may not be known until the entire document or segment is processed. Thus, a token header processor may simply create a blank or partially completed BLOCK token header (e.g., containing just the token header type) and write it to memory for later completion by firmware or software.

In particular, in one implementation a partially completed BLOCK token header is generated upon commencement of parsing of a document or segment. This BLOCK header contains information available at that point, but is not complete because some information needed for the header will not be available until parsing is finished. After the document or segment is parsed, another BLOCK token header is generated and populated with all the desired information, or at least the information that was not available until parsing completed. Firmware then copies the information to the initial BLOCK token header and removes the other.

TABLE 1 describes some token header types that may be employed in an embodiment of the invention. Some types correspond to tokens defined in the XML specification; others are used to facilitate the parsing process. In other embodiments of the invention, more or fewer types of token headers may be defined.

TABLE 1

| Token Header Type | Description |
|---|---|
| STREAM_INFO | Identifies the document being parsed |
| POSITION_BASE | Defines base values for line numbers and column numbers. Some token headers identify line and/or column positions of their corresponding tokens. |
| DOC_DECL | Contains the document declaration of the document being parsed |
| START_DOC | Indicates the start of the document was recognized |
| END_DOC | Indicates the end of the document was reached |
| COMMENT | Contains a comment or identifies where a comment is stored |
| START_TAG | Indicates a start tag was encountered |
| END_TAG | Indicates an end tag was encountered |
| ATTR_DEF | Identifies a token that is the value of an attribute |
| ATTR_STRING | The value of an attribute |
| TEXT | Textual data |
| CDSECT | Contains characters that constitute a CDATA section of the document |
| XML_TEXT | Contains characters that make up a start tag or end tag |
| ENTITY_REF | Identifies an XML entity and its replacement text |
| ENTITY_NAME | Identifies an XML entity for which no replacement text has been found |
| PI | Identifies a processing instruction |
| NS_DEF | Identifies a defined namespace |
| SYMBOL_DEF | Associates a token that is a symbol with its identifier in the symbol table |
| BLOCK | Commences a block of token headers and character data |
| ERROR | Reports an error |
| PADDING | Identifies empty space used for padding or other purpose |
| END | Indicates the end of input was reached |

In one embodiment of the invention, parameters of token headers are stored at 16-bit boundaries to facilitate the transfer of token header information as Java characters. The first portion of each header (e.g., one byte, two bytes) contains the token header's type code. A token, however, may be split over multiple token headers if, for example, the size of a token is greater than a threshold size. In this case a multi-header sequence is generated and the first and last token headers will be marked or flagged accordingly. A multi-header sequence may also be employed when a token straddles two document segments.

Some token headers identify the location of their corresponding tokens within the parsed XML document, by line and/or column for example. Tokens corresponding to data, comments or other sets of information may identify where the data or information is stored, or where it can be found in a stream of data being forwarded from the parser unit. Token headers also allow for multiple namespaces.

By way of example, a START_TAG token header may include a code identifying the token header type, the line and column positions of the corresponding start tag within the XML document, a character offset of the token header within a stream of headers, a namespace identifier, the tag's identifier in the symbol table, the number of attributes within the tag, the number of namespaces defined in the tag, flags indicating various conditions or statuses, etc.

In one embodiment of the invention, the parser unit continually generates token headers as it parses a document, depending on the state of parsing or tokenization. The generated headers produce a stream that describes the document's structure and content. As data are encountered, headers are generated that describe the data (e.g., size, type) and identify where the data are stored.

In this embodiment, token headers and character data are written to different memory areas (e.g., different buffers). Thus, a token header that describes a set of data and is stored in a token header buffer may identify where the data are stored in a data buffer. Descriptors may be used to deliver the buffers' contents to an application or another component of an XML accelerator. The token headers may be binary, in which case they are easily consumed when the token header buffer is read. And, because the characters of the document have been validated in the parser, the application need not perform character validation.

Figure 4:
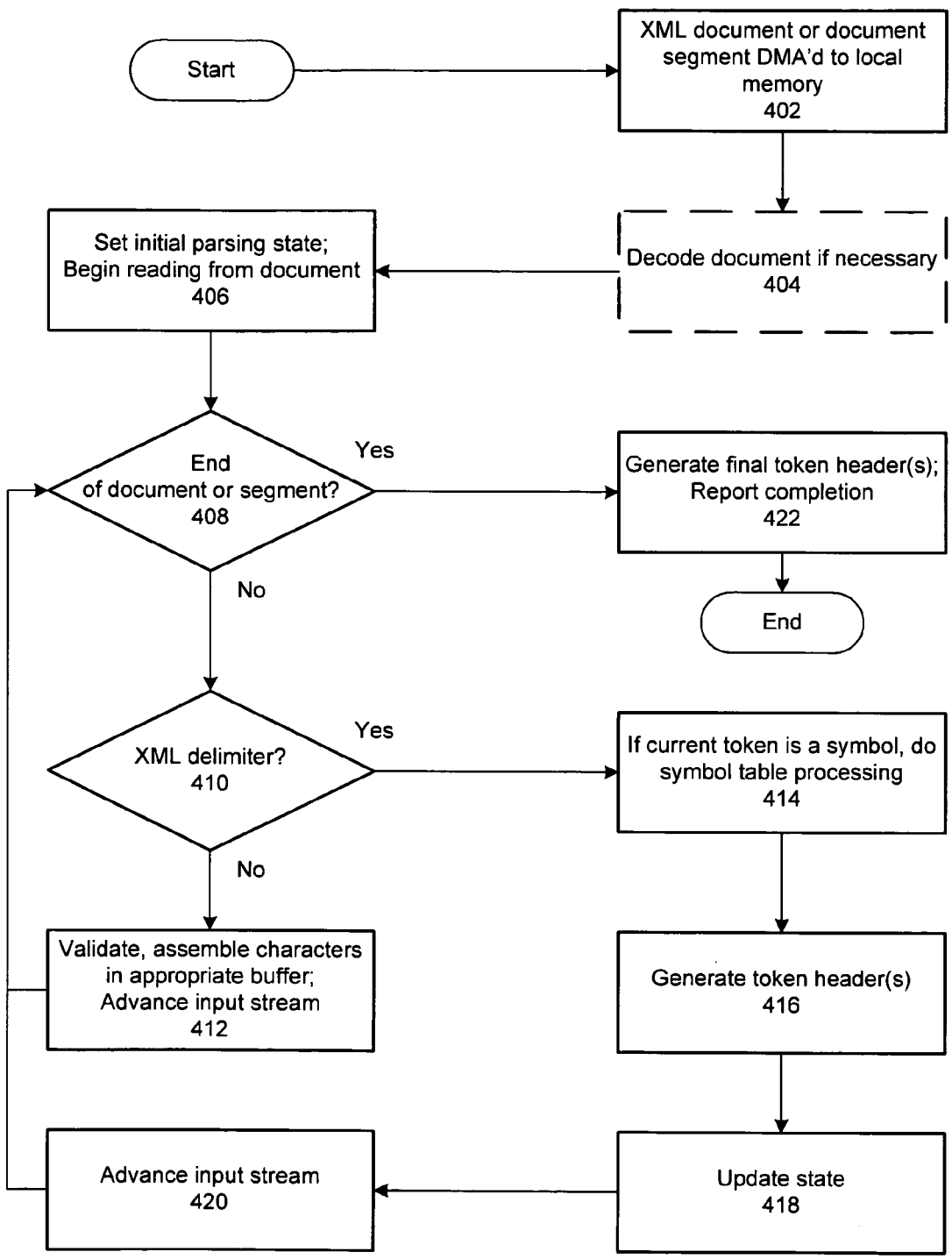
FIG. 4 is a flowchart demonstrating a method of parsing an XML document, in accordance with an embodiment of the invention.

FIG. 4 is a flowchart demonstrating a method of parsing an XML document (or document segment) in a hardware parser unit, according to one embodiment of the invention. In this embodiment, the parser unit is an integral part of a hardware XML accelerator described in the preceding section. In addition, the parser unit includes a finite state machine for controlling the parsing and tokenization, as described in a following section.

In operation 402, an XML document or segment of a document is read into local memory by a DMA engine.

In optional operation 404, the document is decoded as necessary. For example, if the document is to be consumed by a Java application and the document is not already in UTF-16 format, it may be converted to UTF-16. For applications desiring other formats or character sets, the document may be transformed into a format other than UTF-16. In different implementations, the document may be decoded in its entirety, or individual characters, tokens or other entities may be decoded as they are read from the document.

In operation 406, an initial parsing state is set and the parser unit begins reading from the document. Content from a document or document segment may be read in fragments, with each fragment comprising content stored in physically contiguous memory. As described below, the parsing state is maintained by the finite state machine, which drives the extraction of tokens, generation of token headers, and manipulation of the input stream from the document.

In operation 408, if the end of the document or document segment is detected, the method advances to operation 422. Otherwise, the method continues with operation 410. In this embodiment of the invention, a well-formed document always ends with a particular delimiter (e.g., ">" or white space). However, in other embodiments of the invention, such as one in which an XML document may be divided at virtually any point and parsed in segments, the end of the segment being parsed may comprise any character, and be encountered at any time. Illustratively, a document (or document segment) size may be examined to determine when the end of the document (or segment) has been reached.

In one implementation of the illustrated embodiment of the invention, the end of the document or segment may be automatically detected when a fragment of the document or segment is transferred into a local buffer for parsing, or when the input stream of characters is advanced. The remaining characters before the end of document/segment may then be processed normally before advancing to operation 422.

In operation 410, the parser unit (e.g., a tokenization module) determines whether an XML delimiter (including white space) is positioned at the head of an input stream from the current document fragment. If so, the delimiter is extracted and the method advances to operation 414; otherwise, the method continues at operation 412.

In operation 412, one or more characters at the head of the input stream are validated and assembled to form the next token to be moved to a data buffer, symbol buffer or token header buffer, depending on the parsing state.

More particularly, in this embodiment of the invention character validation and action taken with regard to validated characters may depend on the current state of the parsing process. That is, in different states, different types or sets of characters may be legal or illegal, and different tokens may be expected, depending on the applicable XML specification. For example, for a state in which a name (e.g., a tag name, an attribute name) is expected, some characters may be illegal because they cannot be used in a name (e.g., "?", "(", "}").

An error encountered during character validation may be signaled to the tokenizer, which will report the error in a token header. An XML accelerator may resolve the error by executing appropriate firmware.

The validated characters are assembled because they will form the next document token for which a token header will be generated, or will be moved to memory as data, as indicated below. Therefore, a character that is validated as data may be moved to a memory buffer, a character validated as part of a symbol may be moved to a symbol buffer, and a character validated as part of a non-symbol token may be moved to a token header buffer.

Based on the most recent delimiter and/or the previous token, data or a particular type of token (or a specific token) may be expected. An error may be generated if a different type of content is encountered.

After operation 412, the illustrated method returns to operation 408 to determine whether the end of the document or current document segment was reached.

In operation 414, if the token that appears after the delimiter and that was assembled in operation 410 is a symbol, symbol table processing is initiated. In the illustrated embodiment of the invention, the symbol is compared to the contents of the symbol table to determine if there is a match. If so, the symbol's corresponding symbol identifier is retrieved from the table for use in generating a token header. If not, an identifier is generated and the symbol and the identifier are stored in the symbol table.

In one alternative embodiment of the invention, if a symbol is not already stored in the symbol table, a "not found" signal may be issued to report its absence. In this alternative embodiment, a predetermined symbol table may be used for the XML processing and symbols not already included in the table may not be allowed to be added. For example, the document being processed may adhere to a particular schema having a number of known symbols.

In operation 416, one or more corresponding token headers are generated, based on the token. For example, if the token is a symbol and the symbol was already in the symbol table, only one token header may need to be generated.

However, if the token is a new symbol, another token header may be generated to report the mapping of the symbol to its identifier. Other token headers, that do not correspond to specific tokens, may be generated when parsing commences (e.g., to identify the document) or completes, to report an error, and/or for other reasons.

As described previously, a token header may comprise just a token header type (e.g., SYMBOL_DEF, START_TAG) or may include a type and one or more parameters. The token header is stored in memory for delivery to the application.

Other parameters of a token header, as needed, may be added by firmware, software, or some other component of the XML accelerator or parser unit.

In one embodiment of the invention, token headers and data are stored in separate blocks of memory (e.g., buffers). As each block is filled, a new one is employed and one of the final token headers in the old block will be configured to identify the new block.

In operation 418, the tokenizer's finite state machine is updated to reflect a state transition triggered by the most recent delimiter. In this embodiment of the invention, state transitions are triggered by particular XML delimiters or delimiter patterns, but the resulting state also depends on the previous parsing state. The new state may be the same as the old state.

In operation 420, the input stream is advanced as necessary. For example, some number of characters may be shifted out of an input buffer and more characters read from the document. After operation 420, the illustrated method returns to operation 408 to test for the end of a document or document segment.

In operation 422, any necessary final processing is performed. This may include saving the parsing state (e.g., if the parsed XML content was only a segment of a document), generating and forwarding final token headers, saving the symbol table, etc. A parsing state saved upon completion of parsing of one document segment will be fetched when the next segment of the document is to be parsed.

A Programmable Hardware FSM for Facilitating Document Parsing

In one embodiment of the invention, a programmable hardware finite state machine (FSM) is provided for facilitating tokenization (i.e., the generation of token headers) of a structured data stream. The data stream may represent a document structured according to XML, HTML (HyperText Markup Language), SGML (Standard Generalized Markup Language) or some other protocol or language.

Other types of structured data streams that may be parsed using a programmable hardware FSM include packets formatted according to some communication protocol, database records, and so on. Implementations of this embodiment of the invention are described below as they may be implemented for an XML document, but may be readily modified by one of ordinary skill in the art for other types of data streams.

The different states of the FSM correspond to different possible statuses of the processing of an XML document (or a segment of a document). In this embodiment, the machine controls the tokenization process by recognizing delimiter strings within an XML document being parsed, and initiating corresponding state transitions.

In one implementation, the FSM is implemented using a ternary CAM (Content Addressable Memory), or TCAM, with associated RAM (Random Access Memory) and control logic. Each entry in the TCAM comprises two primary components (but may include more): a parser/tokenization state and a delimiter pattern of any number (zero or more) of characters designed to match an XML delimiter or other markup entity.

Thus, within a given TCAM entry, the entry's state corresponds to a state of the parsing process, and the delimiter described by the delimiter pattern defines a transition from that state to another (or the same) state. Because the TCAM is ternary, a delimiter pattern may include one or more wildcards that will match any character.

For example, using "*" as a wildcard character, a delimiter pattern of "<*" will match delimiters beginning with "<?" and <!". As one of ordinary skill in the art will recognize, XML markup delimiters are of variable length, and may overlap. That is, a shorter delimiter may be part of (or a subset of) a longer delimiter.

The associated RAM is programmed with signals, values or codes configured to cause control logic to effect state transitions (e.g., to update the current state, initiate generation of a token header, shift the input stream, update a symbol table). In one embodiment, the finite state machine is software programmable, thereby permitting modifications to the states and the delimiter patterns that define and initiate state transitions, and the signals for performing transitions.

In one embodiment of the invention, the FSM receives a stream of characters from an XML document (or a segment of an XML document). One or more characters of the stream are fed to the TCAM, along with the current parsing state. Within the TCAM, one or more entries will include that state, and have delimiter patterns defining possible transitions from the current state.

Any or all of those entries will match, or "hit" on, the input. In one implementation, longest-prefix matching is employed, so that the matching TCAM entry that has the most specific delimiter pattern will be selected.

For the selected TCAM entry, a hit signal is raised to the accompanying RAM. An entry in the RAM is selected based on the hit signal, which causes a next parser state to be activated. As described previously, other action may be taken to generate a token header, update a symbol table, etc.

Figure 5:
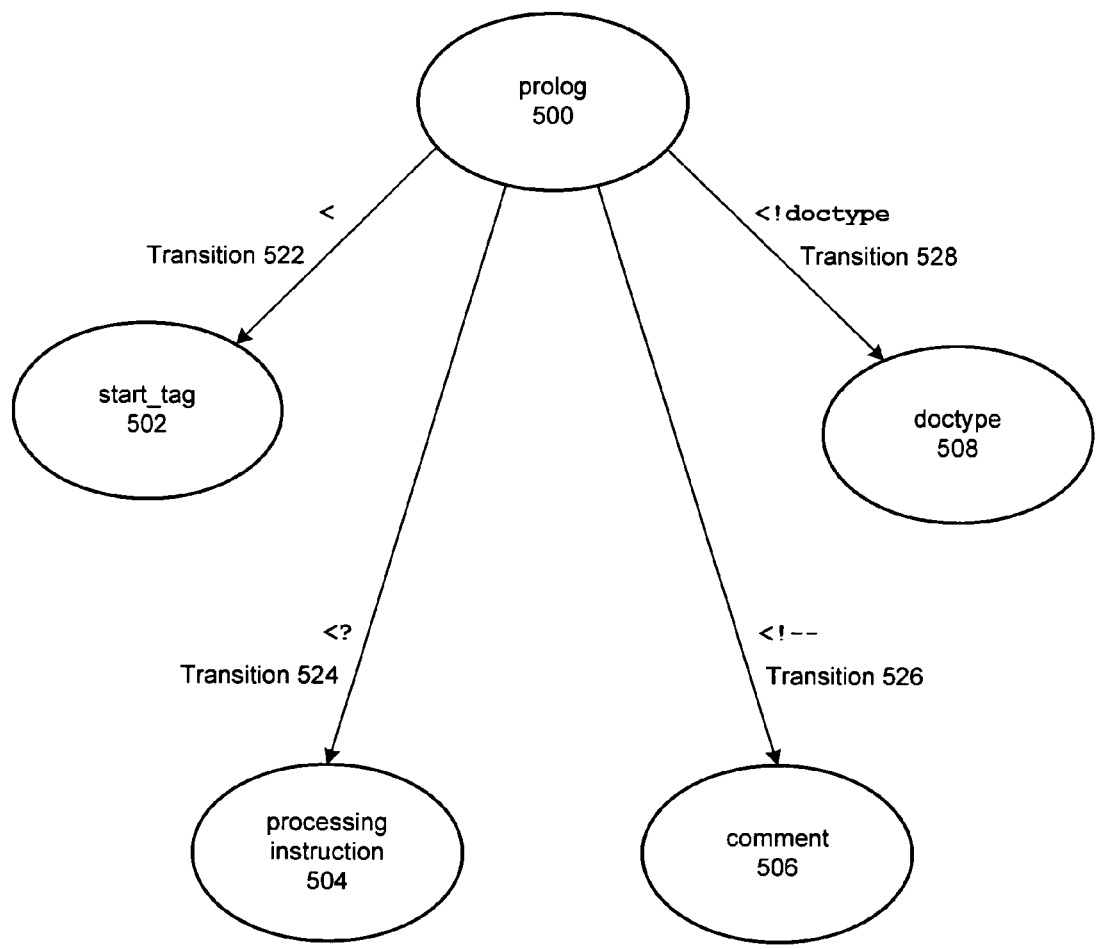
FIG. 5 illustrates a plurality of XML processing states and state transitions, in accordance with an embodiment of the present invention.

FIG. 5 is a state diagram illustrating just a few of the possible parsing states that may be encountered in an embodiment of the invention. In this diagram, states are represented as ovals, and state transitions are represented by lines connecting one state to another.

The state diagram of FIG. 5 includes five states: prolog state 500, start-tag state 502, processing instruction (or PI) state 504, comment state 506 and doctype state 508. From prolog state 500, state transition 522 leads to start-tag state 502, transition 524 leads to PI state 504, transition 526 leads to comment state 506 and transition 528 leads to doctype state 508.

The various state transitions are defined or identified by the indicated delimiters. For example, the delimiter string "<" (not including the quotation marks) may activate transition 522. However, if the "<" character is followed by "?", then transition 524 may be activated. Similarly, delimiter strings "<!—" and "<!doctype" trigger transitions 526 and 528, respectively.

It can therefore be seen that while delimiters may be used to identify transitions between states within a tokenizer FSM, pattern matching of a delimiter string must be applied carefully to ensure the appropriate delimiter string is recognized. Otherwise, input of a delimiter string such as "<!doctype" may cause transition 522 to be triggered because the first character matches a known delimiter.

To design and program a hardware finite state machine in an embodiment of the invention, an all-encompassing state diagram may be generated to identify all possible parsing states, all transitions between states, and the delimiter or other character input strings that trigger the various transitions. In effect, then, the parsing of an XML document in an embodiment of an invention is captured in a state diagram that is implemented within a programmable hardware finite state machine.

Figure 6:
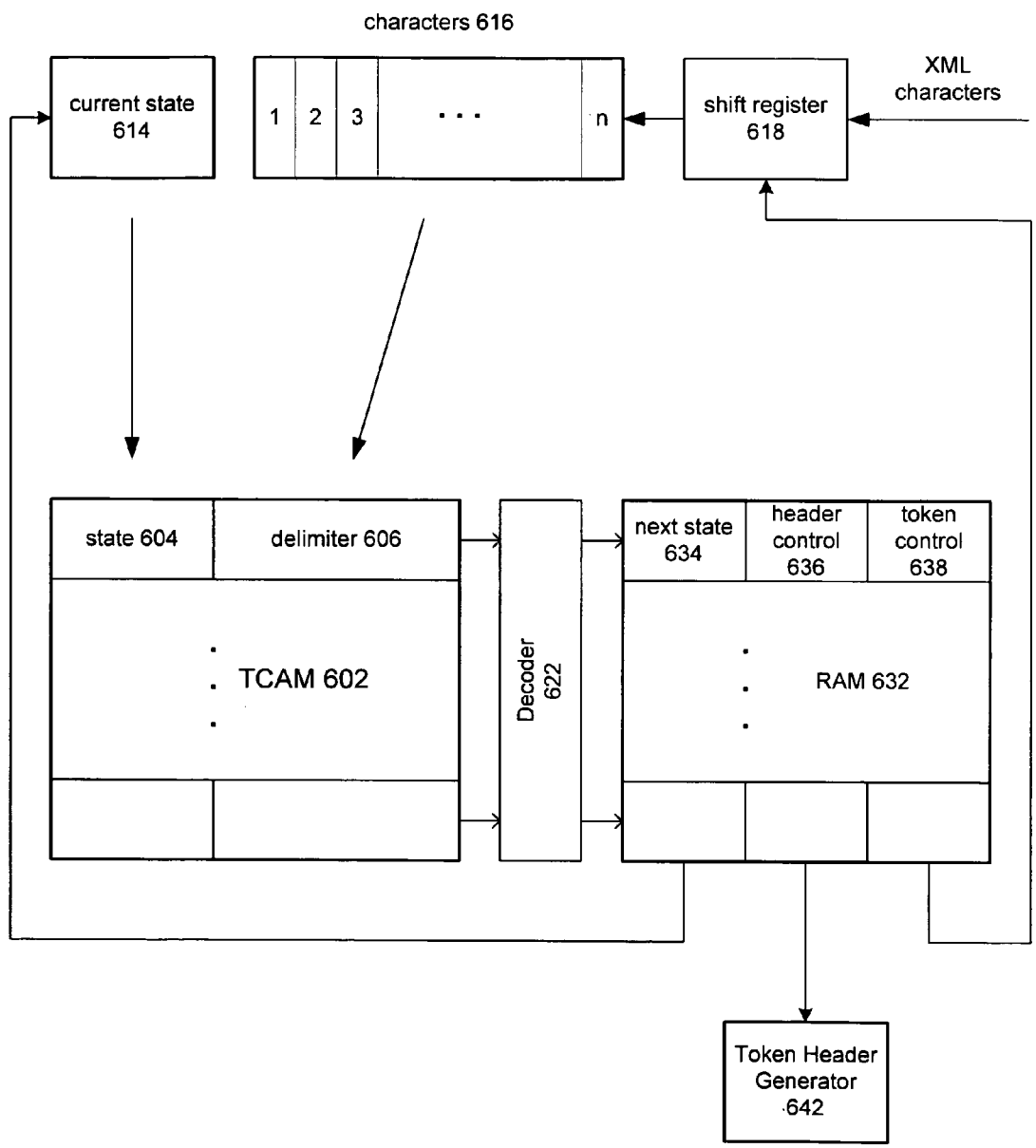
FIG. 6 is a block diagram of a programmable hardware finite state machine (FSM) for facilitating tokenization of an XML document, in accordance with an embodiment of the invention.

FIG. 6 depicts a hardware finite state machine for facilitating the tokenization of an XML document, according to one embodiment of the invention. In this embodiment, the FSM is implemented within a hardware module comprising a TCAM/RAM. The hardware module may include other components, such as a processor, a symbol table, logic modules for performing other tasks (e.g., DMA reads and writes), etc. This embodiment is thus well suited for implementation within a hardware XML accelerator discussed above.

Entries within TCAM 602 comprise two primary fields (but may include others): state 604 and delimiter pattern 606. State field 604 identifies a parsing state, while delimiter pattern 606 is a pattern of characters describing an XML markup delimiter that causes a state transition if encountered during the state indicated by state field 604.

Each entry in TCAM 602 is unique, but multiple entries may identify the same state or the same delimiter pattern. States may be identified by numerical, alphanumerical or alphabetic identifiers. Delimiter patterns may also include any alphabetical and/or numerical characters. A delimiter pattern may include a wildcard or "don't care" character, such as "*" or "X". A wildcard character matches any input character.

More particularly, in one embodiment of the invention, the state and delimiter pattern fields may comprise bit patterns. A bit pattern for either or both fields may include a wildcard portion (e.g., two or three bits), thereby allowing one input to match on multiple entries.

In one embodiment of the invention, TCAM 602 is large enough to store on the order of 64, 128 or 256 entries. In particular, the TCAM is large enough to store entries identifying all parsing or tokenization states and all possible transitions from each such state.

Current state 614, which may be stored in a register or other memory location, identifies the current state of the parsing of an XML document. Characters 616 comprise a number (n) of characters, which are read from the document and provided as input to TCAM 602. In one embodiment of the invention, up to ten characters may be input to the TCAM simultaneously. The size of delimiter patterns 606 may match the size of character storage 616.

In other embodiments, character string input may be of different sizes. And, in different parsing states, different numbers of characters, or different subsets of characters 616 may be input to TCAM 602.

Shift register 618 operates to shift characters into or out of characters 616. As described below, for example, part of a state transition may involve advancing the input string of characters past a delimiter that triggered a transition.

In one implementation of the illustrated embodiment of the invention, n whitespace character detectors—one for each position in characters 616—may be interposed between characters 616 and TCAM 602. The whitespace detectors are used to reduce the number of permutations of whitespace characters located near delimiters, thereby reducing the number of entries required in the TCAM.

Decoder 622 receives one or more hit signals from TCAM 602 each time a string of characters and current state 614 are input to TCAM 602 and match at least one entry. More specifically, the input string of characters may match one or more delimiter patterns stored in the delimiter field 606 of TCAM entries. One or more of those entries may have a value in their state fields 604 that matches current state 614. Thus, one or more entries may "hit" on the combination of current state 614 and input from characters 616. Hit signals are raised to decoder 622 for each matching entry in TCAM 602.

In the illustrated embodiment of the invention, entries are arranged in TCAM 602 in a strategic order to facilitate longest-prefix matching. In particular, within each set of entries having the same value in state field 604, the entry having the most specific or precise value in delimiter pattern field 606 (e.g., the fewest wildcard characters) will have the lowest index or position in the TCAM. In FIG. 6, this may correspond to appearing closer to the top of TCAM 602.

Below the most specific entry, other entries will be stored according to the precision of their delimiter patterns. Thus, the entry having the most general delimiter pattern (e.g., the most wildcard characters) will have the highest ordinal index among the set of entries, and be closer to the bottom of TCAM 602. When an entry matches on the input, its hit signal corresponds to that entry's index or position within the TCAM.

Because only one state transition may be activated at a time in the FSM, if multiple hit signals are raised, one must be chosen. In this embodiment of the invention, the transition corresponding to the entry having the lowest hit signal (i.e., the matching entry having the most precise delimiter pattern) will be selected by the decoder.

As described above, RAM 632 is programmed with information for effecting a state transition and taking action as dictated by the transition and/or the new state. In the embodiment of the invention depicted in FIG. 6, RAM 632 is populated with one entry for each entry in TCAM 602. Each entry includes next state 634, header control 636 and token control 638.

Next state field 634 identifies the next parsing state to enter, and causes current state 614 to be updated accordingly. Header control field 636 identifies which token header, if any, is to be generated in association with the state transition. Token control field 638 indicates how the input stream of characters should be adjusted, by shift register 618 or some other component. The token control field may specify some action to be taken other than the shifting of characters within the input stream. In one implementation, fields 634, 636 and/or 638 store values, codes or signals that are interpreted by control logic (not shown in FIG. 6).

Based on a hit signal from decoder 622, a corresponding entry in RAM 632 is read. Current state 614 is updated to the indicated next state, which will change the input to TCAM 602 for the next comparison.

Token header generator 642 generates the token header identified by the header control field, if any. In the illustrated embodiment of the invention, generation of a token header may involve reading some number of characters from characters 616 and/or the document being parsed. For example, the name or value of an attribute may be retrieved for inclusion in the header. Further details regarding the generation of token headers are provided in a preceding section describing the operation of a parsing unit within an XML accelerator.

Also, the content of characters 616 is updated based on the control information specified in token control field 638. Illustratively, this information may indicate that some number of characters is to be shifted into or out of character storage. Instead of or in addition to control information, token control field 638 may store a token header identifier, token header management information, information regarding the next state, the identity of a buffer into which a set of characters is to be stored, etc.

In other embodiments of the invention, TCAM 602 and/or RAM 632 may include other fields, in addition to or in place of those depicted in FIG. 6. For example, RAM 632 may also include fields for: indicating whether to perform character validation on characters associated with the current token; indicating whether the current token relates to document structure or character data; indicating to symbol table logic that a symbol is part of a name prefix or a local name; etc.

In general, the RAM portion of a programmable hardware FSM stores information for determining the next tokenization state to transition to, identify the type of token currently being parsed, determine a number of delimiter characters to skip or mask, provide character validation information for token types and tokenization states, and supply any other necessary information for extracting character data, symbols and token header information.

Figure 7:
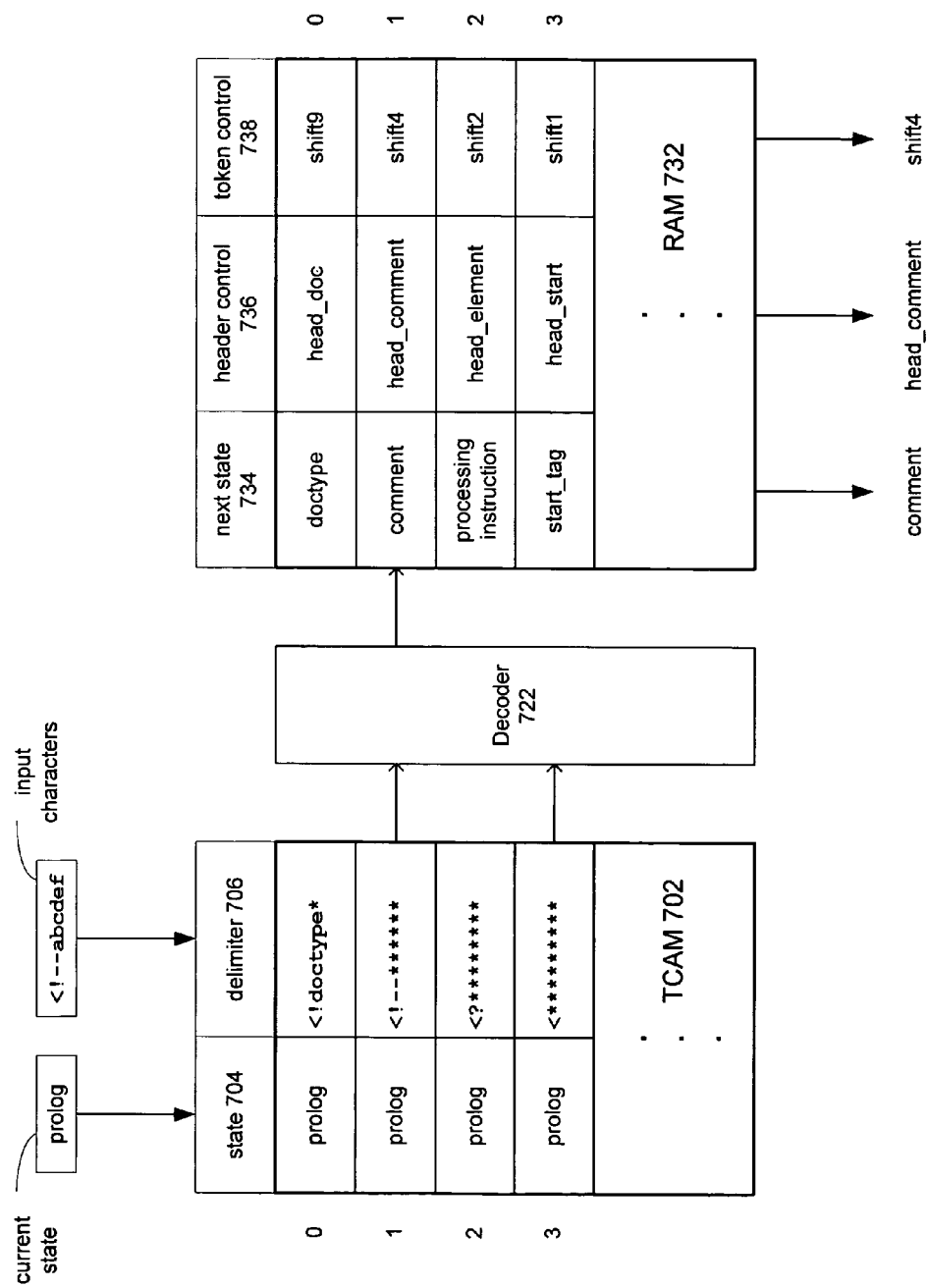
FIG. 7 depicts a portion of the FSM of FIG. 6 as it may be programmed for the processing states and state transitions of FIG. 5, according to one embodiment of the invention.

FIG. 7 demonstrates the operation of a programmable hardware FSM for facilitating parsing and tokenization, according to one embodiment of the invention. TCAM 702 of FIG. 7 is programmed with entries designed to implement the state diagram of FIG. 5.

In particular, TCAM 702 is programmed with four entries (index numbers 0-3) having state field values corresponding to the "prolog" state, and delimiter field values corresponding to the delimiter string patterns that will activate the transitions depicted in FIG. 5. The prolog state entry having the lowest index (i.e., index 0) has a delimiter pattern that is more specific than the others. For example, the delimiter pattern for entry 0 matches only the specific XML delimiter "<!doctype" while entry 3 will match any input sequence of characters that begins with "<".

In the sample operation of a programmable hardware state machine illustrated in FIG. 7, input to TCAM 702 includes the current state (i.e., "prolog") and a string of characters from the XML document currently being parsed (e.g., "<!—abcdef").

As described above, the input is compared to all entries of the TCAM. Two hit signals are raised, for entry 1 and entry 3. Decoder 722 identifies the hit signal that has the lowest TCAM index (i.e., the signal for TCAM entry 1), and signals or applies the corresponding entry (i.e., entry 1) in RAM 732. In one embodiment of the invention, the selected logic within RAM 732 is executed by a processor embedded within the same hardware module or XML accelerator as the FSM.

As a result, the FSM will transition to the "comment" state, and a portion of the hardware module that identifies the current state will be updated to identify the comment state. Logic for generating token headers will generate a COMMENT token header (e.g., a token header that reports the comment following the XML delimiter "<!—").

And, as the token control field indicates, the input sequence will shift 4 characters. This will advance the input string past the delimiter "<!—", which will put the first character of the comment at the front of the input string.

As one skilled in the art will understand, TCAM 702 would also be programmed with entries for all other states and state transitions. Therefore, one or more entries in the TCAM would have a state field value of "comment" and match on the comment text to be parsed, and at least one TCAM entry would have a state field of "comment" and a delimiter field matching the end comment delimiter.

Thus, in one embodiment of the invention, a hardware XML tokenizer is provided utilizing a TCAM/RAM combination. The current state of the parsing of an XML document or document segment is maintained and provided as input to the TCAM, along with a sequence of characters from the document or document segment being processed. Each time the combined input matches an entry in the TCAM, a corresponding entry in the RAM is read to activate a state transition, possibly generate a token header, and adjust the character input.

In this embodiment, if the combined input (i.e., current state and XML characters) does not match any entry in the TCAM, the characters (e.g., characters 616 of FIG. 6) are shifted m characters (m≧1), thereby causing the same number of characters to be pushed out of the character stream. Another comparison is performed using the updated sequence of characters.

As described in a previous section, contents of the character stream may also be used to identify tokens and symbols, and may be validated to ensure the characters are valid XML characters.

Virtualized XML Processing

In one embodiment of the invention, an XML accelerator is configured for virtualized parsing of an XML document. In this embodiment, virtualized parsing entails parsing a document in segments, which may begin or end at any point in the document. Segment sizes may be random, or may correspond to disk blocks, memory pages, packets or other physical or logical constructs.

With virtualized parsing, a single large document need not monopolize resources of the accelerator to the detriment of other documents. For example, the parsing of segments of different documents or data streams may be interleaved. In addition, a document may be parsed in stages as individual packets, pages or other segments of the document are received.

A hardware XML accelerator for performing virtualized parsing may be configured similarly to accelerator 202 of FIG. 2, or may be configured differently. In general, the accelerator has a limited number of resources for performing XML processing or other tasks (e.g., a single XML parser unit or cryptographic unit), which must be shared among multiple processors or other users or applications. For example, each thread of a multi-core processor may service a separate document, and all threads may share one or a few XML parser units.

In an embodiment of the invention, state information regarding the parsing of a document is saved after each segment is parsed, and that state information is reloaded when the next segment is to be parsed. State information may identify the location in the document at which parsing last stopped, the parsing state (e.g., if a finite state machine is used for parsing), identities or locations of memory buffers in which token headers and/or data were stored during the last parsing evolution, a partial token (e.g., if parsing of the previous segment ended while a token was being parsed), errors encountered during the last parsing iteration, etc.

In this embodiment of the invention, a symbol table may be preloaded into symbol table memory, and may be shared among multiple documents. Also, a symbol table memory may store multiple symbol tables simultaneously. A symbol table for a particular document may remain in memory or be swapped out between parsing sessions of that document.

Access to a symbol table may be via a DMA engine, and symbol tables may be maintained in fast memory (e.g., FCRAM, fast DRAM). Insertion of new symbols may or may not be permitted with a preloaded symbol table. If a symbol table does not allow insertion of new symbols, when a new symbol is identified during parsing, a special token header may be generated (e.g., by a token header processor) to report the occurrence.

The parsing of a new document segment may be initiated by creation of an entry (e.g., a descriptor) in a work queue. In addition to identifying the document segment to be parsed, a work queue entry may identify a memory location from which state information from the parsing of a previous segment may be retrieved and/or to which state information from parsing of the new segment should be stored. The work queue entry may also provide other information, such as the location and size of the document segment, the location and size of the document's symbol table, flags for indicating segment status (e.g., initial document segment, final document segment), etc.

When a parser unit (e.g., hardware XML parser unit 212 of FIG. 2) reads a work queue entry, the document segment may be moved (e.g., via DMA) if necessary, and parsing begins. Each segment may be treated as a sequence of fragments, with each fragment comprising a portion of the segment stored in physically contiguous memory.

When parsing of the segment is complete, state information may be saved and a completion descriptor may be configured, an interrupt may be issued, or a processor of the XML accelerator may learn of the completion of parsing in some other manner (e.g., via polling).

Figure 8:
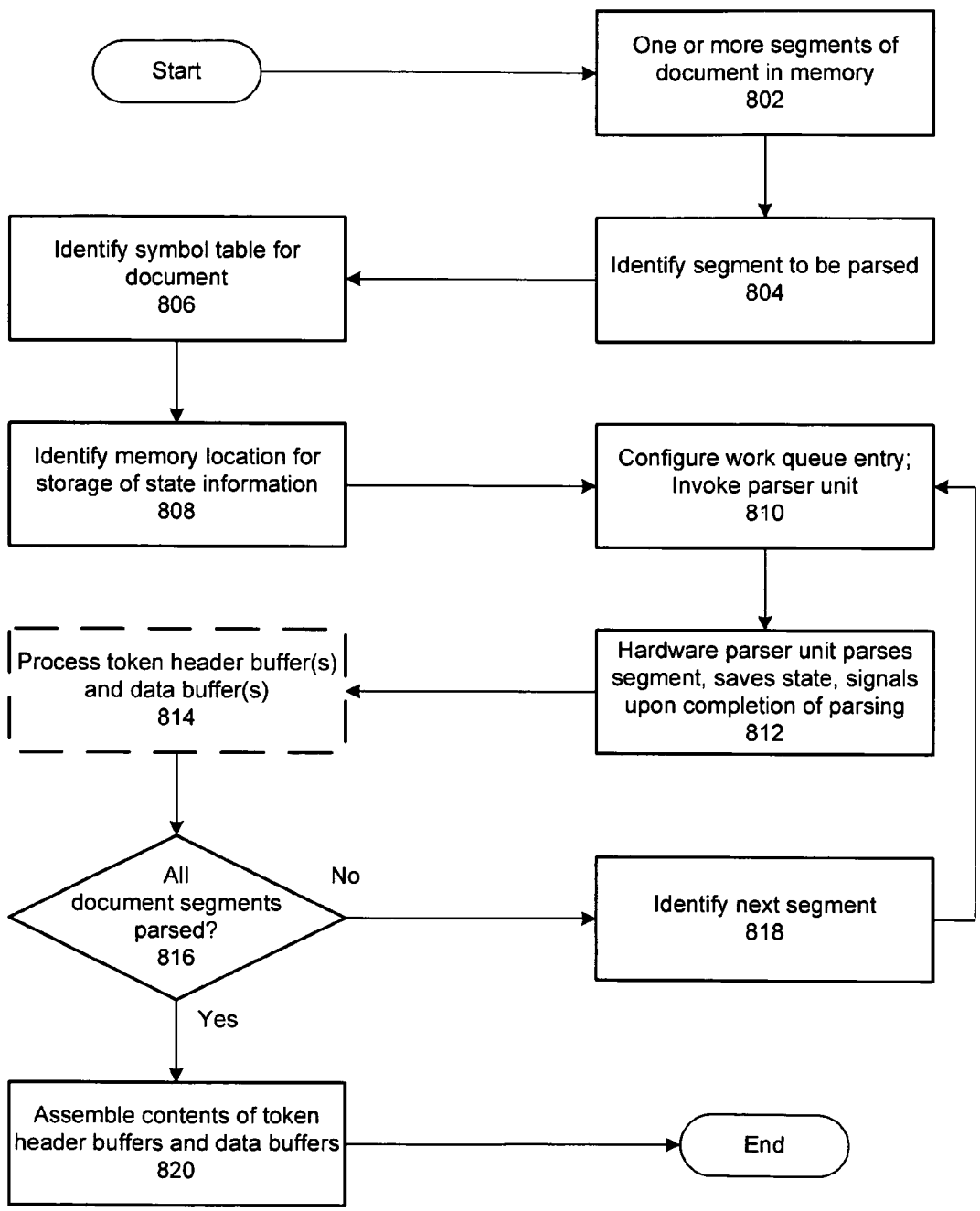
FIG. 8 demonstrates a method of virtual XML parsing, in hardware, according to one embodiment of the invention.

FIG. 8 demonstrates a method of virtualized parsing of an XML document according to one embodiment of the invention. In this embodiment, the XML accelerator that performs the virtualized parsing may include multiple processors, hardware parser units, cryptographic engines, DMA engines and/or other components. Thus the virtualized parsing of one document may be interleaved with, or performed simultaneously with, the virtualized parsing of another document.

In operation 802, one or more segments of the document are available in memory. For example, the entire document may be available (e.g., read from some other storage), or only a first segment of the document have been received (e.g., via a network interface). The segments may correspond to packets, memory pages, disk blocks or other logical or physical constructs.

In operation 804, a first segment to be parsed is identified. In this embodiment of the invention, document segments are parsed in order, to ensure sequential parsing of the entire document. Thus, if no other part of the document has yet been parsed, the first segment is identified.

In operation 806, a symbol table for the document is identified and may be preloaded. For example, if the document purports to be a UBL (Universal Business Language) document, a symbol table containing some or all UBL standard names may be preloaded. The symbol table may also be used for some or all other documents processed by the XML accelerator.

In operation 808, a memory location is identified at which to store state information regarding the parsing of the documents' segments. The state memory will initially be empty or nearly empty (i.e., when the first segment of the document is to be parsed), but may be reused over and over as each segment's parsing is completed, so that the information will be available when the next segment is parsed.

In operation 810, a processor of the XML accelerator (e.g., the same processor that performed operations 804-808) configures an entry in a work queue to pass the relevant information to a parsing unit. The work queue may take any form, such as a FIFO, a descriptor ring, etc.

The work queue entry is configured to identify the starting position and length of the segment, the starting position and length of the document's symbol table, the memory area or location to use for storing parsing state information, and so on. The work queue entry may also identify an initial set of token header and data buffers in which the parsing unit can store token headers and data during parsing. Or, the parsing unit may obtain the buffers when it starts parsing.

Also in operation 810, the processor signals a hardware XML parsing unit to indicate there is work to be done. The signal may be raised by configuring a register read by the parsing unit, directly signaling the unit, etc.

In operation 812, the hardware parser unit parses the document segment. Parsing may be performed as described in a previous section. As described in that section, the parsing may entail generation of token headers describing the structure of the document and extraction of the document's data.

In one implementation, the parsing of a document segment may proceed in fragments, with each fragment comprising a part of the segment that is stored in contiguous physical memory. In this implementation, fragments of a document segment are loaded into physical memory in sequence.

When the parsing unit finishes parsing the document segment, it saves state information describing the ending state of the parsing, such as a character position within the document, the state of a finite state machine that controls the parsing, information regarding any errors encountered during the parsing, a location of a partial token (e.g., if parsing terminated within a token), locations of buffers for token headers and/or data, etc.

The parsing unit signals an XML accelerator processor in some manner to indicate that it has completed its work. The signal may comprise configuration of another descriptor, an interrupt, etc. Alternatively, the processor may poll the parsing unit to determine if it has completed its work.

In operation 814, the processor may process the contents of token header buffers and data buffers used by the parsing unit. For example, the processor may transfer the contents (e.g., via DMA) to a different location in preparation for forwarding the token headers and data to an application. In another embodiment of the invention, the processor may not process the buffers until the entire document has been parsed.

In operation 816, the processor determines whether all segments of the document have been parsed. If so, the method advances to operation 820.

Otherwise, in operation 818, the processor identifies the next document segment (e.g., next network packet, next disk block) and returns to operation 810 to initiate the next parsing session, which may occur any time after completion of parsing of the previous segment. Before the next segment of the document is parsed, for example, the same parsing unit may be used to parse a segment of any number of other documents.

When second and subsequent parsing sessions are initiated, the parsing unit invoked for the session will read a corresponding work queue entry to obtain document segment and symbol table information, and will retrieve state information stored from the previous parsing session. State information may be stored and retrieved via DMA operation.

In operation 820, all document segments have been parsed, and so the processor assembles the contents of the token header buffers and data buffers used by the parsing unit during the last parsing session or all parsing sessions. Illustratively, the contents are assembled to produce a stream describing the information set of the document to an application. After operation 820, the processor turns to a next document or ends.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. The scope of the invention is defined by the appended claims, not the preceding disclosure.

What is claimed is:

1. A method of processing a structured data stream in hardware, the method comprising:
   receiving the data stream at a hardware module of a host computer system, the hardware module comprising:
      a content-addressable memory; and
      a random access memory;
      wherein an entry in said content-addressable memory comprises:
         a given state of the processing of the data stream; and
         a character pattern configured to match a delimiter within the data stream, wherein the character pattern defines a transition from the given state of the processing of the data stream to another state;
   reading a sequence of characters from the data stream;
   comparing the sequence of characters and a present state of the processing with entries in the content-addressable memory;
   identifying a first entry in the content-addressable memory that matches the sequence of characters and the present state of the processing;
   reading a first entry in the random access memory corresponding to the first entry in the content-addressable memory; and
   initiating generation of a token header identified in the first entry in the random access memory, said token header configured to describe the data stream to an application executing on the host computer system.

2. The method of claim 1, wherein the data stream is an XML (Extensible Markup Language) document.

3. The method of claim 1, wherein said token header describes:
   data extracted from the data stream; or
   structure of the data stream.

4. The method of claim 1, further comprising:
   transitioning from the present state of the processing to a next state identified in the first entry in the random access memory.

5. The method of claim 1, further comprising:
   adjusting the sequence of characters in a manner described in the first entry in the random access memory.

6. The method of claim 1, further comprising:
   shifting the sequence of character a number of positions identified in the first entry in the random access memory; and
   reading one or more additional characters from the data stream.

7. The method of claim 1, further comprising:
   if no entry in the content-addressable memory matches the sequence of characters and the present state of the processing, reading additional characters.

8. The method of claim 1, wherein said hardware module further comprises:
   a processor configured to control the processing, wherein said processor is a processor other than a central processing unit of the computer system.

9. The method of claim 1, wherein said hardware module further comprises:
   a processor configured to control the processing, wherein said processor is a central processing unit of the computer system.

10. The method of claim 1, wherein each entry in the content-addressable memory comprises:
    an identifier of one state of the processing; and
    a delimiter pattern corresponding to one or more delimiters;
    wherein the hardware module is configured to transition from the one state to another state if a delimiter corresponding to the delimiter pattern is detected in the sequence of characters.

11. The method of claim 1, wherein each entry in the random access memory comprises:
    an identifier of a next state of the processing; and
    an indication of how to adjust the sequence of characters.

12. The method of claim 11, wherein one or more entries in the random access memory further comprise:
    an identifier of a token header to be generated and conveyed to the host computer system.

13. A computer readable medium storing instructions that, when executed by a computer, cause the computer to perform a method of processing a structured data stream in hardware, the method comprising:
    receiving the data stream at a hardware module of a host computer system, the hardware module comprising:
       a content-addressable memory; and
       a random access memory;
       wherein an entry in said content-addressable memory comprises:
          a given state of the processing of the data stream; and
          a character pattern configured to match a delimiter within the data stream, wherein the character pattern defines a transition from the given state of the processing of the data stream to another state;
    reading a sequence of characters from the data stream;
    comparing the sequence of characters and a present state of the processing with entries in the content-addressable memory;
    identifying a first entry in the content-addressable memory that matches the sequence of characters and the present state of the processing;
    reading a first entry in the random access memory corresponding to the first entry in the content-addressable memory; and
    initiating generation of a token header identified in the first entry in the random access memory, said token header configured to describe the data stream to an application executing on the host computer system.

14. A hardware module for processing a structured data stream, wherein the hardware module is installed in a host computer system and comprises:
    a CAM (Content Addressable Memory) comprising multiple entries, each entry including:
       an identifier of a state of processing of the data stream; and
       a character pattern describing a data stream delimiter, wherein the character pattern defines a transition from the state of processing of the data stream to another state;
    an indicator of a current state of the processing of the data stream; and
    a sequence of characters from the data stream;

wherein said CAM is searched for one or more entries comprising an identifier of said current state and a character pattern matching on said sequence of characters.

15. The hardware module of claim 14, wherein the data stream is an XML (Extensible Markup Language) document.

16. The hardware module of claim 14, further comprising a RAM (Random Access Memory) having multiple entries, each entry configured to identify:
   a next state of the processing of the data stream; and
   an adjustment to make to the sequence of characters.

17. The hardware module of claim 16, wherein one or more entries in the RAM further include:
   an identifier of a token header to generate, said token header to be conveyed to an application executing on the host computer.

18. The hardware module of claim 16, wherein the RAM is software programmable.

19. The hardware module of claim 14, further comprising a decoder configured to:
   receive signals from the one or more CAM entries;
   select one of the one or more CAM entries; and
   select a corresponding entry in a RAM (Random Access Memory) identifying a next state of the processing of the data stream.

20. The hardware module of claim 14, wherein the CAM is a ternary CAM.

21. The hardware module of claim 14, wherein the CAM is software-programmable.

22. The hardware module of claim 14, wherein the hardware module is a plug-in board for a computer system.

23. Within a computer system configured to receive a structured data stream, a circuit for processing the data stream, the circuit comprising:
   a content-addressable memory, wherein each entry in the content-addressable memory comprises:
      a state of processing of the data stream; and
      a pattern configured to match a data stream delimiter, wherein the pattern defines a transition from the state of processing of the data stream to another state; and
   coupled to the content-addressable memory, a random access memory comprising, for each entry of the content-addressable memory, an identifier of a next state of processing of the data stream;
   wherein the circuit transitions from a present state of processing the data stream, to a next state identified by a first entry in the random access memory, when a corresponding first entry of the content-addressable memory matches a combination of a present state of processing of the data stream and a sequence of characters from the data stream.

24. The circuit of claim 23, wherein the data stream is an XML (Extensible Markup Language) document.

25. The circuit of claim 23, wherein the random access memory further comprises, for each entry of the content-addressable memory:
   an adjustment to be made to the sequence of characters.

26. The circuit of claim 25, wherein the adjustment comprises a shift of characters.

27. The circuit of claim 23, wherein the random access memory further comprises, for one or more entries of the content-addressable memory:
   an identifier of a token header to be conveyed from the circuit to an application executing on the computer system, said token header facilitating the delivery of data and/or data stream structure from the data stream to the application.

* * * * *

UNITED STATES PATENT AND TRADEMARK OFFICE
CERTIFICATE OF CORRECTION

PATENT NO. : 7,596,745 B2  Page 1 of 1
APPLICATION NO. : 11/272762
DATED : September 29, 2009
INVENTOR(S) : Dignum et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Twenty-eighth Day of September, 2010

David J. Kappos
*Director of the United States Patent and Trademark Office*